(12) United States Patent
Cordell et al.

US009443556B2

(10) Patent No.: US 9,443,556 B2
(45) Date of Patent: Sep. 13, 2016

(54) VIDEO ACQUISITION AND COMPILATION SYSTEM AND METHOD OF ASSEMBLING AND DISTRIBUTING A COMPOSITE VIDEO

(75) Inventors: Michael Cordell, Birmingham (GB); Paul Michael Seaton, Hove (GB); Marcus Timothy Boden, Hilton (GB)

(73) Assignees: E-Plate Limited, Birmingham (GB); UStar Limited, Birmingham (GB)

( * ) Notice: Subject to any disclaimer, the term of this patent is extended or adjusted under 35 U.S.C. 154(b) by 678 days.

(21) Appl. No.: 13/380,402

(22) PCT Filed: Jul. 1, 2010

(86) PCT No.: PCT/GB2010/051085
§ 371 (c)(1),
(2), (4) Date: Mar. 14, 2012

(87) PCT Pub. No.: WO2011/001180
PCT Pub. Date: Jan. 6, 2011

(65) Prior Publication Data
US 2012/0162436 A1    Jun. 28, 2012

(30) Foreign Application Priority Data

Jul. 1, 2009    (GB) .................................. 0911393.7
Sep. 18, 2009  (GB) .................................. 0916408.8
Nov. 20, 2009  (GB) .................................. 0920342.3

(51) Int. Cl.
*H04N 7/18*        (2006.01)
*G11B 27/034*     (2006.01)
(Continued)

(52) U.S. Cl.
CPC ............. *G11B 27/034* (2013.01); *G07C 1/24* (2013.01); *G11B 27/10* (2013.01); *G11B 27/322* (2013.01);
(Continued)

(58) Field of Classification Search
CPC .......................... G08B 13/19621; H04N 7/185
USPC ........................................................ 348/158
See application file for complete search history.

(56) References Cited

U.S. PATENT DOCUMENTS

| 5,655,053 A | 8/1997 | Renie |
| 2003/0109306 A1* | 6/2003 | Karmarkar .............. G07F 17/32 463/40 |

(Continued)

FOREIGN PATENT DOCUMENTS

| EP | 1578130 | 9/2005 |
| WO | WO 2005/025234 | 3/2005 |

OTHER PUBLICATIONS

Kosmopoulos Et al: "Vision-based production of personalized video," Signal Processing. Image Communication, Elsevier Science Publishers, Amsterdam, NL vol. 24, No. 3, Mar. 1, 2009, pp. 158-176.

(Continued)

*Primary Examiner* — Chikaodili E Anyikire
(74) *Attorney, Agent, or Firm* — Beyer Law Group LLP

(57) ABSTRACT

FIG. 7 shows a camera system (700) that operates to time-stamp video content captured from multiple cameras (740) relative to a recorded and time-synchronized location of a portable tracking unit (722). The position of the cameras (740) is known to the system. Based on the time and position data for each uniquely identifiable tracking unit, an editing suite (770) automatically compiles a composite video made up from time-spliced video segments from the various cameras. Video or still images captured by the cameras (740) are cross-referenced against the client address stored in database (760) and related to the assigned, uniquely identifiable tracking unit (722). A server (750) is arranged to use the client address to send reminder messages, which reminder messages may include selected images taken by the composite video. Alternatively, a client (720) can use the client address to access the database and view the composite video. In the event that the client (720) wants to receive a fair copy of the composite video, the server (750) is arranged to process the request and send the composite video to the client. Streaming of multiple video feeds from different cameras that each encode synchronized time allows cross-referencing of stored client-specific data and, ultimately, the assembly of the resultant composite video that reflects a timely succession of events having direct relevant to the client (720).

14 Claims, 7 Drawing Sheets

(51) Int. Cl.
- G11B 27/10 (2006.01)
- G11B 27/32 (2006.01)
- H04N 5/77 (2006.01)
- H04N 7/173 (2011.01)
- H04N 21/218 (2011.01)
- H04N 21/231 (2011.01)
- H04N 21/414 (2011.01)
- H04N 21/4223 (2011.01)
- H04N 21/433 (2011.01)
- H04N 21/441 (2011.01)
- H04N 21/472 (2011.01)
- H04N 21/475 (2011.01)
- H04N 21/8352 (2011.01)
- G07C 1/24 (2006.01)
- G07C 9/00 (2006.01)
- G07C 11/00 (2006.01)

(52) U.S. Cl.
CPC .......... *G11B 27/323* (2013.01); *H04N 5/77* (2013.01); *H04N 7/17318* (2013.01); *H04N 7/185* (2013.01); *H04N 21/21805* (2013.01); *H04N 21/23109* (2013.01); *H04N 21/41415* (2013.01); *H04N 21/4223* (2013.01); *H04N 21/4334* (2013.01); *H04N 21/441* (2013.01); *H04N 21/4751* (2013.01); *H04N 21/47202* (2013.01); *H04N 21/47205* (2013.01); *H04N 21/8352* (2013.01); *G07C 9/00111* (2013.01); *G07C 2011/02* (2013.01)

(56) References Cited

U.S. PATENT DOCUMENTS

| | | | |
|---|---|---|---|
| 2004/0131184 A1* | 7/2004 | Wu | G08B 13/19647 380/202 |
| 2006/0234765 A1* | 10/2006 | Herberger | G11B 27/034 455/552.1 |
| 2008/0303901 A1* | 12/2008 | Variyath | G01S 5/02 348/143 |
| 2009/0041298 A1* | 2/2009 | Sandler | G11B 27/034 382/103 |

OTHER PUBLICATIONS

Anonymous: "Van Egdom's Revolutionary New Video System for Waterparks," Internet Citation Apr. 8, 2008, p. 1, XP007915106 Retrieved from the Internet: URL: http://www.blooloop.com/PressReleases/Van-Egdom-s-Revolutionary-New-Video-System-for-Waterparks/773, [retrieved on Sep. 27, 2010]the whole documen.

Andreas Heinemann et al: "iClouds—Peer-to-Peer Information Sharing in Mobile Environments," May 29, 2004, Euro-Par 2003 Parallel Processing; [Lecture Notes in Computer Science;;Lncs], Springer-Verlag, Berlin/Heidelberg, pp. 1038-1045.

* cited by examiner

VIDEO ACQUISITION AND COMPILATION SYSTEM AND METHOD OF ASSEMBLING AND DISTRIBUTING A COMPOSITE VIDEO

FIELD OF THE INVENTION

This invention relates, in general, to a video acquisition and compilation system and methods of recording, assembling and supplying a composite video in a server-based system. More particularly, but not exclusively, the present invention relates to an automated process that permits the association of individual recordings to targeted individuals, the recording typically made in an extreme sports or leisure environment, such as on a mountain during skiing activity, race tracks or rollercoasters. Aspects of the invention also relate to a video camera system and methods of recording and supplying data in a server-based system.

RELATED APPLICATIONS

The present application is related to co-pending UK patent applications GB 0916408.8 (filed on 18 Sep. 2009), GB 0911393.7 (filed on 1 Jul. 2009) and GB 0920342.3 filed on 20 Nov. 2009.

SUMMARY OF THE PRIOR ART

In the field of leisure pursuits, especially in extreme leisure activities such as funfair rides, people are often photographed at a certain location when an "adrenaline rush" is taking place. For example, on a roller coaster, still cameras are often located at the bottom of a steep decent in order to capture the faces' of passing riders. These photographs are then displayed, for a short period of time, on one or more monitors at an exit kiosk. Following the rider's disembarkation from the ride car and exit via a kiosk, the rider is presented with a limited opportunity to locate their own image, review the image and then to purchase copies of that image, if desired.

As will be appreciated, the photographs can be printed in a number of different formats, including as hard paper copies and as images on mugs or shirts.

One of the drawbacks of the current system is that it is "hit or miss" in that the rider's face may either be obscured or the picture may not capture the intended or perceived best expression of anxiety that a thrill-seeking rider might want to purchase and keep as a souvenir. In any event, the rider must wait for the images to be presented and this leads to missed opportunities for the rider to experience a maximum number of rides within a theme park, for example, in a given time.

Additionally, to maximize commercial opportunities by maximizing image throughput, ride operators will not process, edit or enhance the recorded images so the rider is also given a limited "take it or leave it" option. Not only does this approach waste revenue generating opportunities for the ride operator, but the rider can become dissatisfied given an earlier level of expectation, especially if the rider had to queue for a significant period of time to experience the ride.

In any event, even image identification (on the monitors at the exist kiosk) may be difficult given the high speed shuttering required to capture a fast moving face. In fact, image quality is also a factor that affects the rider's decision on whether or not to purchase the image, so any poor or "blurred" image from the fixed nature of the camera mount position represents a missed commercial opportunity.

It is also known for professional photographers to assign an identifier or unique photo code to a photograph taken by them of clients and then to communicate this photo code (e.g. QMW123/09) to those clients to permit limited review or access to a related photographic proof. By way of explanation, the photographer's website may include a log-in page that is activated with a corresponding log-in code (also made available to the clients, e.g. by letter). Low quality, impaired or watermarked photographic images for sale can then be accessed by entry into the website and use of the unique photo code. The client therefore has an ability to review a relevant photographic proof and then to order the photograph. Again, the client is presented with "Hobson's choice", namely take it or leave it.

U.S. Pat. Nos. 5,576,838 and 5,655,053 describe personalized video system for acquiring video of an individual consumer as shot at an amusement park or the like and combining those images with standard, pre-shot video of rides or attractions. The system includes cameras for generating digital video signals of the consumer at several locations on the attraction which are marked by an identification processor with information identifying the particular attractions with the particular consumer and stored in memory. The identifying information and information as to which of several attractions have been frequented by an individual are input by means of a card to a controller. Upon receipt of signals indicating the consumer wishes to receive a completed video, the controller generates command signals for a video assembler to create the final video product inserting the personalized video signals as appropriate in a standard pre-shot film.

SUMMARY OF THE INVENTION

According to a first aspect of the present invention there is provided a video acquisition and compilation system comprising: a) a portable location and tracking unit having a unique identity, the portable location and tracking unit arranged to record and store position data against time; b) a plurality of cameras arranged to capture and communicate time-stamped video content, the cameras arranged in time synchronicity with respect to the portable location and tracking unit, the cameras positioned, in use, at known locations across a geographic region; c) a server arranged to effect storage in a database of both the time-stamped video content and also the position data and time of the portable tracking unit, the server configured automatically to control assembly of a composite video constructed from splicing together time stamped video content from the plurality of cameras with correspondingly synchronized position and time data recovered from the portable location and tracking unit, wherein storage in the database of composite video at least cross-references the unique identity of the portable tracking unit against client details.

In a preferred embodiment, the client details reflect a client address stored in the form of at least one of an internet account and a cell phone number; and the composite video is made available to the client address by at least one of: automatically sending at least a portion of the composite video directly to the client address; and providing access to at least a portion of the composite video upon receipt of at least one of the client address and the unique identity of the portable location and tracking unit from an internet log-in page.

The composite video may be rendered and stored directly onto a portable storage device.

Advantageously, the various aspects and embodiments of the present invention operate to ensure that a client has continuing access to customized video or picture data of their participation in an activity. Beneficially, once registered, the client is associated with a specific camera in a specific location and unique client data, such as a personal cell phone number or e-mail address, can be used to proactively associate the client with a particular file and subsequently to communicate customized video or pictures to the client.

Embodiments permit the video to be made available to the client via an internet log-in or otherwise in automated burst transmissions or streamed transmissions (representing a snap-shot or "commercial" of the entire file) to a registered 3G phone over an air interface of a telecommunications system. The client is therefore reminded of the recorded event and prompted to consider longer-review or permanent local storage. Furthermore, the proactive contact of the client with "commercial" mitigates the client's loss of time in queuing to review the video at the end of a particular activity.

Embodiments of the present invention generally prevent unrestricted access to recorded files, since the recorded data files are personal, are subject to copyright and have a commercial value. Consequently, file encryption techniques may be employed to restrict review or time splicing may be employed to provide limited quality. However, the various embodiments generally permit the video to be viewed (at least to some extent) at the leisure of the client. Optionally, the client may be permitted to identify specific frames of interest and then to communicate the selected frame (or portion of a frame) to the supplier for full delivery.

In a second aspect of the present invention there is provided a method of assembling a video, the method comprising: in a portable location and tracking unit having a unique identity, recording and storing position data against time; at each of a plurality of cameras positioned at known locations across a geographic region, capturing time-stamped video content and communicating this time-stamped video content to a remote database, the cameras arranged in time synchronicity with respect to the portable location and tracking unit; storing in the remote database both the time-stamped video content from each of the cameras and also the position data and time recovered from the portable tracking unit; automatically assembling a composite video constructed from splicing together time stamped video content from the plurality of cameras with correspondingly synchronized position and time data recovered from the portable location and tracking unit, the composite video cross-referenced against at least the unique identity of the portable tracking unit and client details.

In a preferred embodiment, the client details reflect a client address stored in the form of at least one of an internet account and a cell phone number and the method further includes: making the composite video available to the client address by at least one of: automatically sending at least a portion of the composite video directly to the client address; and providing access to at least a portion of the composite video upon receipt of at least one of the client address and the unique identity of the portable location and tracking unit from an internet log-in page.

The method of assembling a video may further comprise: determining whether access to a data record containing the composite video has occurred; and generating the message if no access to the data record has occurred within a predetermined time. It may also be desirable to ascertain whether the data record is wanted; and confirm a delivery format for the data record in the event that the data record is wanted.

In a preferred embodiment, the method of operating further comprises: determining whether access to a data record containing the composite video has occurred; and generating the message if no access to the data record has occurred within a predetermined time.

In a third aspect of the present invention there is provided a video acquisition and compilation system comprising: a) a portable location and tracking unit having an associated memory in which is stored a marker related to a boundary to a field of view associated with at least one external camera; b) a principal camera connected to and movable with the portable location and tracking unit, the principal camera arranged to provide, in use, captured video data; c) a wireless receiver for selectively acquiring, in use, streamed video content transmitted from the at least one external camera; d) a controller located with and connected to the principal camera, the controller designed or configured, in use, to control storage of the captured video data from the principal camera, wherein the controller is further designed or configured to control assembly of a composite video based on position information acquired from the portable location and tracking unit, the composite video being assembled through selective time-splicing of captured video data from the principal camera with the streamed video content from the at least one external camera position received at times when the location and tracking unit identifies that it is substantially within the boundary of the field of view associated with at least one external camera.

In a fourth aspect of the invention there is provided a video acquisition and compilation system comprising: a) a portable location and tracking unit arranged to record and store position data against time; b) at least one camera and more preferably a plurality of cameras arranged to capture and communicate time-stamped video content, each camera arranged in time synchronicity with respect to the portable location and tracking unit, each camera having known instantaneous locations; c) a server responsive to the data recorded by the portable location and tracking unit and further responsive to the time-stamped video content, the server arranged to effect storage in a database of both the time-stamped video content and the position data and time of the portable tracking unit, the server arranged to configured automatically to control assembly of a composite video constructed from splicing together time stamped video content from selected ones of the plurality of cameras with correspondingly synchronized position and time data recovered from the portable location and tracking unit.

Preferably, storage of composite video at least cross-references the unique identity of the portable tracking unit against client details, thereby permitting uploading and access to the composite video by an interested party.

In at least one of the embodiments, the data recorded by the portable location and tracking unit and the time-stamped video content share a common reference time.

In a further aspect of the invention there is provided a camera and data delivery system comprising: at least one camera having an associated camera identity and a field of view, the camera arranged, upon activation, to capture image data from its field of view; a seat associated with the at least one camera, a region of the seat at least partially framed in the field of view of the camera; a controller arranged to effect storage in memory of image data recorded by the camera, wherein storage in memory of captured image data cross-references the camera identity against a client address and a mobile device code, the controller acquiring the mobile device code from a trigger event initiated locally to the seat, the trigger event causing the controller to associate the mobile device code with the camera identity for a predetermined period of time and to initiate the capture of image data from the camera into memory, and wherein: the client address is one of an internet account and a cell phone number; and the controller is configured to make captured image data available to the client address by at least one of: automatically sending at least a portion of the captured image data directly to the client address; and providing access to at least a portion of the captured image data upon receipt of at least one of the client address and the related mobile device code communicated to the controller from an internet log-in page.

The controller may include a camera controller associated with the seat and moveable with the ride car; and a system controller external to the ride car and selectively connectable to the camera controller, whereby a download of cross-referenced image data from the camera is selectively supplied to the system controller for storage in a database.

In yet another aspect there is provided a ride seat in a ride car, the ride seat comprising: a camera coupled to the ride seat, the camera having an associated and unique camera identity and a field of view, the camera arranged, upon activation, to capture image data from its field of view and wherein a region of the ride seat is at least partially framed in the field of view of the camera; a detector arranged to sense the presence of a mobile device code; a camera controller and an associated memory, the camera controller coupled to the detector and responsive to the mobile device code, the camera controller arranged, in use, to associate the camera identity with the mobile device code and to capture and store, in the memory for a selectable period of time, image data from the camera's field of view, the camera controller generating a cross-reference in the memory between captured image data against a client address and the mobile device code, thereby providing a unique data recovery path to time-sensitive image data captured and stored and associated with the client address.

In still yet a further aspect there is provided a fairground ride comprising: a plurality of ride seats as previously outlined, each ride seat associated with a camera having a unique camera identity; a system controller automatically arranged to: effect storage in a database of cross-referenced image data recorded by each camera and recovered from memory associated with specific cameras for identified ride seats; generate reminder messages for client addresses included in the database and cross-referenced to specific mobile device codes, each client address related, at least in part, to at least one mobile device code; establish a communication link to the client address; and send the reminder messages over the communication link to the client address.

Another aspect provides a method of operating a camera system in a ride used in a leisure activity, the method comprising: acquiring personal address information from a rider and storing this personal address information in memory, the personal address information including at least one of a mobile telephone number and an internet account; assigning a unique user identity to the rider, the user identity recorded against the personal address information; selectively associating a camera identity, uniquely assigned to a specific camera in the camera system, with the unique user identity and storing this association in memory, the association lasting for a predetermined period of time; activating the camera to capture image data from the camera's field of view, the captured data stored as a time-sensitive data record in memory that is cross-referenced to at least one of the personal address information and the unique user identity; and at least one of: i) sending automatically a message to at least one of the mobile telephone number and the internet account, the message including at least one of: a log-in code providing a unique data recovery path to the data record; and at least a portion of captured image data stored in the data record; and ii) providing access to at least a portion of the data record upon receipt from an internet log-in page of at least one of the internet account and the unique user identity.

In still yet another aspect of the invention there is provided a server arranged to effect storage in memory of captured image data recorded by a camera having an associated camera identity and a field of view, the server configured or arranged: to store captured image data by cross-referencing the camera identity against at least one of a client address and a mobile device code; to acquire the mobile device code from a trigger event notified to the server and initiated locally to a ride seat at least partially framed in the field of view of the camera, to associate the mobile device code with the camera identity for a predetermined period of time and to initiate the capture of image data from the camera into memory in response to identification of the trigger event; to make captured image data available to the client address by at least one of: automatically sending at least a portion of the captured image data directly to the client address, the client address being realised by one of an internet account and a cell phone number; and providing access to at least a portion of the captured image data upon receipt of at least one of the client address and the related mobile device code communicated to the server from an internet log-in page.

A racetrack video acquisition system, of another aspect, comprises: a) a car having: a car signature that is electronically transmittable over an uplink; an in-car reader configured to acquire a driver identity and further configured to communicate the driver identity and the car signature over the uplink to cause recordal of a temporal association between the car signature and the driver identity; and at least one camera arranged to capture and stream video content over the uplink, the video content encoded with at least one of the driver identity and the car signature; b) a server arranged to effect storage in a database of the streamed video content, wherein storage in the database of video content at least cross-references the driver identity against a client address and wherein: the client address is one of an internet account and a cell phone number; and the server is configured to make streamed video content available to the client address by at least one of: automatically sending at least a portion of the streamed video content directly to the client address; and providing access to at least a portion of the streamed video content upon receipt of at least one of the client address and the driver identity communicated to the server from an internet log-in page.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
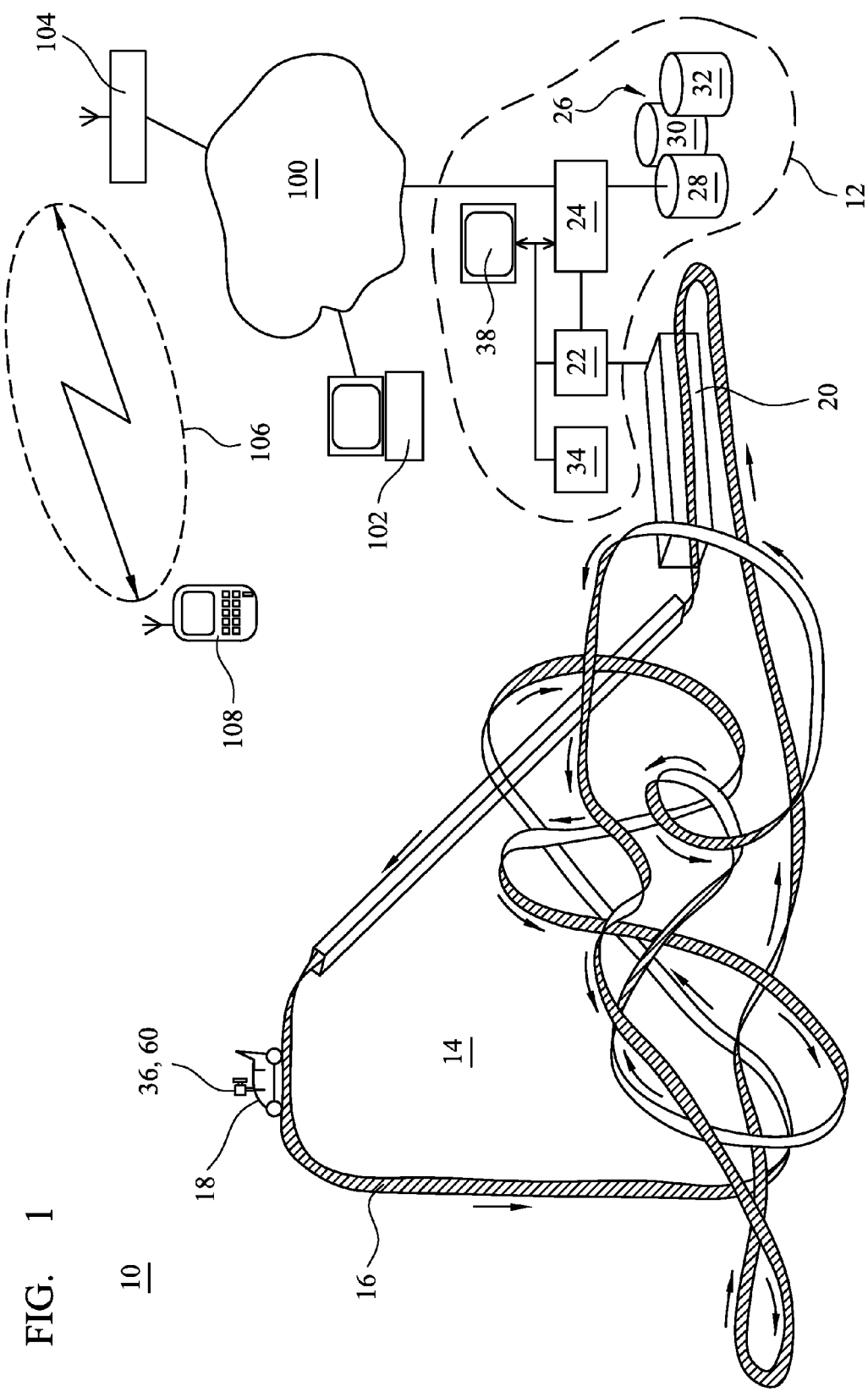
FIG. 1 is a diagram of a leisure environment which contains a camera, registration and data delivery system according to a preferred embodiment of the present invention.

FIG. 1 shows a leisure environment 10 that includes a camera, registration and data delivery system 12 according to a preferred embodiment of the present invention.

The leisure environment 10 is presented, for reasons of explanation only, as a roller coaster ride 14 having a track 16, at least one ride car 18 (and generally multiple ride cars) and a kiosk 20 generally permitting embarkation and disembarkation of riders into the ride car 18. It will therefore be understood that the implementation of the system is not restricted to such a leisure environment, but rather that the camera, registration and data delivery system 12 can find application wherever opportunities exists for personalized, third party photography or video capture.

In terms of the camera, registration and data delivery system 12, this can be a distributed system where individual system components are physically separated but interconnected. Alternatively, the related components can be consolidated and commonly located. Functions may be implemented by software code or through hardware; this is merely design choice.

In one embodiment, a registration terminal 22 is located at a centralized service point, such as kiosk 20. However, the mobile nature of a cell phone (or the like, e.g. a portable RFID tag) permits the registration process to take place at any suitable point and any at time, including at the park or elsewhere and either on the day or prior to the visit.

The registration terminal 22 (wherever this is located) is coupled to a system controller 24, such as a computer, that operates to coordinate overall control of the camera, registration and data delivery system 12. The system controller 24 is coupled to a database 26 that stores: i) captured data 28; ii) client reference information 30 cross-referenced to client specific captured data 28; and iii) ancillary data 32, such as accounting or payment data and third party web-site data. The registration terminal 22 therefore provides a functional point of access into the system controller through which a mobile telephone number (or electronic serial number or RFID code) can be obtained and logged into the system's database and thus to register a client code.

A data recovery unit 34 is further coupled to the system controller 24, which data recovery unit 34 permits selective and controlled download of captured data from one or more cameras 36 located around the track of the roller coaster and, more especially, from cameras within specific ride cars 18.

The system controller 24 is usually coupled to a monitor 38 to facilitate data entry, data review and data manipulation or editing. Generally, the system controller 24 includes a graphic user interface and, optionally, a software-based picture editing suite.

The registration terminal 22 (and more particularly the process of registration) is configured to permit the association of unique personal data, e.g. an e-mail address or a cell phone number, to a sensor 50 (see FIG. 2) that is loaned to or has been purchased by a rider 52. The portable, mobile sensor 50 contains a unique ID code 51 (e.g. XYZ 123 of a particular portable, mobile device) and this ID code is cross-referenced against the unique personal data. The sensor 50 can be realised by an active or passive device. For example, the sensor 50 can be an RFID tag or a readable bar code or chip on a smart card. The sensor could also be the ESN or phone number of a cell phone or PDA.

Figure 2:
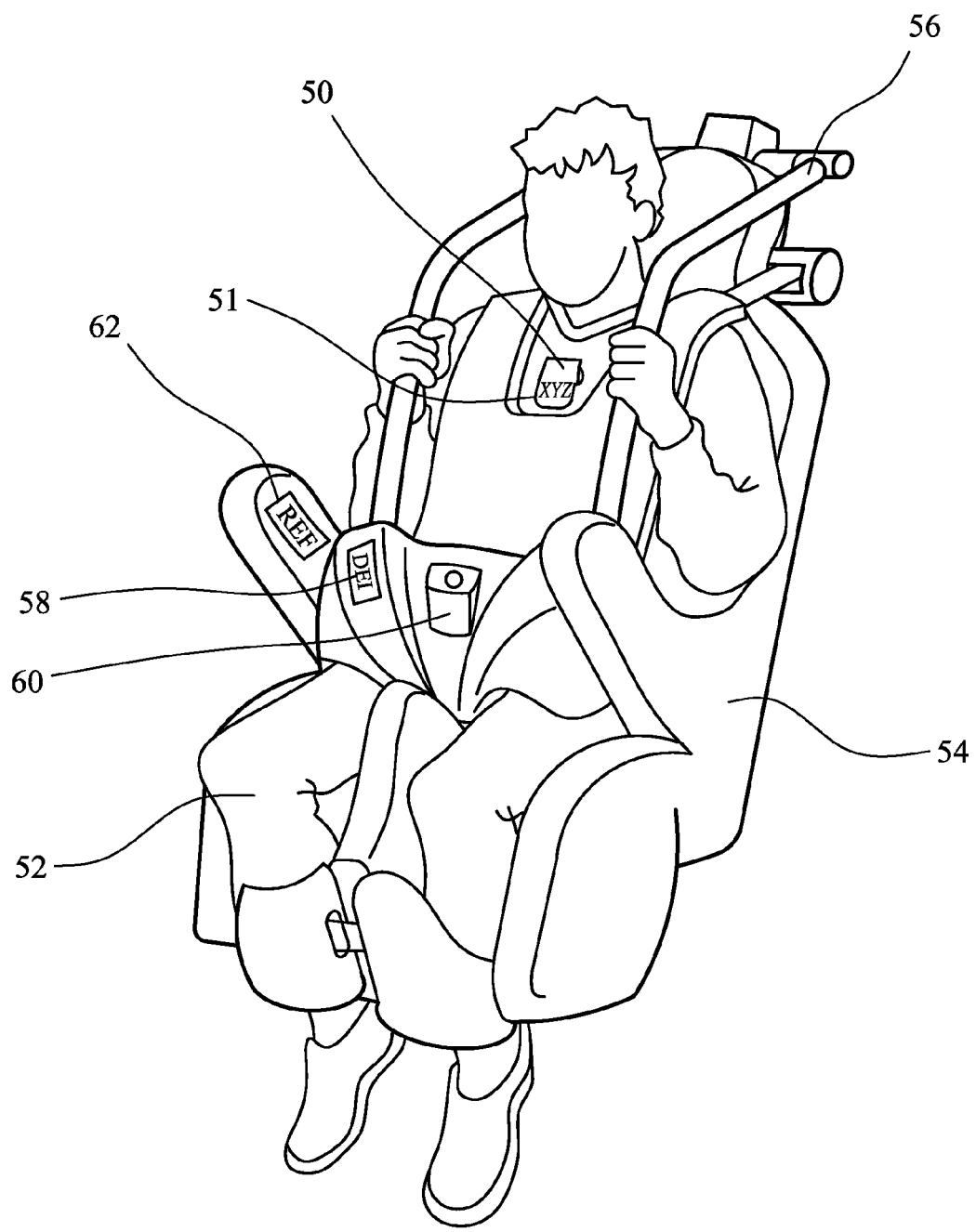
FIG. 2 is an exemplary roller coaster ride seat incorporating sensor and camera technologies that support a preferred operating method of the system of FIG. 1.

In FIG. 2, a rider 52 (i.e. a client) is shown in situ in a seat 54 that is fixed into a fairground ride or the like. The sensor 50 may be worn by the rider 52 or can otherwise be carried by the rider 52. The rider 52, in the specific case of a fairground ride, is appropriately restrained by a security harness 56, such as a seatbelt or body restraint. The seat 54 furthermore includes a detector 58 that interacts with the sensor 50 to extract the ID code 51 and therefore to permit and cause association of that ID code to at least one specific camera.

The ID code 51 is then communicated to a camera controller (reference numeral 70 of FIG. 3) to store a local record of the association between the camera and the unique ID code 51 for a predetermined/temporary period of time.

The detector 58 can be integrated into the seat 54 or be part of the harness (by way of example) and may itself include an activation device, such as a pressure or proximity sensor or a button that limits the operational state of a related camera 60 to a point in time when the seat is occupied and the activation device placed in an functional state. Alternatively, the detector 58 can be integrated into the camera or otherwise provided as a stand alone unit proximate to the seat 54 and generally within a ride car 18.

For example, a proximity sensor in the handlebars of a fairground ride interacts with an RFID wristband to extract the ID code and to feed a ride reference (e.g. camera name and time) to the system controller 24. The update of the database 26 can be achieved before the ride starts or after the ride ends, but preferably occurs whilst the ride car 18 is stationary at the embarkation/disembarkation kiosk 20.

Preferably, the detector has a short range that is restricted to the immediate vicinity of the seat 54. Range can be limited by power control or coding scheme or both. By way of example, the detector may be implemented with BlueTooth® connectivity in the radio frequency spectrum having a range of about ten meters and preferably less.

Based on an initial sign-up regime that both identifies the unique client contact point (e.g. phone or account) and which assigns the unique ID code 51, seamless registration at the ride is therefore achieved through the interactions between, for example, an RFID tag or cell phone and the detector 58, and captured image data can afterwards be directed or supplied to the rider through use of the client contact point. Preferably, the association is temporarily stored locally to the ride car, and then communicated to off-site storage (e.g. database 26) at an appropriate point in time, e.g. at the end of the ride or event when full download of the captured data occurs.

Preferably, the camera 60 is either integrated into the seat 54 or otherwise is positioned in or on any suitable structure within the ride car 18 or superstructure 61. The camera 60 may be designed to have a substantially fixed field of view that centralizes the position (or particular feature, such as the upper body or face) of the rider 52 within a recorded frame or sequence of frames. Of course, the field of view for the camera 60 may be wider or adjustable and include, for example, a plurality of adjacent seats 54 or an entire ride car 18.

Generally, to ensure protection, the camera 60 is flush mounted with a non-projecting surface, or is otherwise located in a position that has a substantially zero impact risk factor with any flailing body part of the rider 52.

The seat 54 may, optionally, include a reference plaque 62 containing a camera identification number ("REF").

For example, since a ride car typically includes multiple seats, a preferred embodiment makes use of a local scanner carried by a ride attendant to record occupancy of a seat and associate occupancy to the rider. More specifically, a rider is provided with an RFID tag or ticket containing a bar code, whereas the seat (or a row of seats or an entire car) is also provided with a fixed reference ID, such as a bar code or another RFID tag. As previously indicated, a rider identity is recorded against the RFID tag (e.g. incorporated into a wristband) or ticket issued to the rider to provide a unique association and tracking capability. Once the rider is seated, the ride attendant makes use of a scanner (which, as appropriate, is a bar code reader, an RFID reader or the like) firstly to acquire the identity of the seat, row or car (and thus to identify the relevant camera 60 associated with that seat, row or car) and then to acquire the identity of the rider through scanning/reading of the rider's unique RFID tag or bar code. Since the ride attendant is obliged to systematically check that the safety harnesses of each seat are secured, the ride attendant is ideally placed to scan and record the association between the rider and the camera assigned to cover the rider's position. The use of a handheld scanner reduces the complexity of the implementation by avoiding the necessity to integrate sensors into ride seats and/or harnesses.

Acquired occupancy data is therefore also concurrently obtained and stored, which occupancy data permits ride utilization statistics to be assembled over time and analysed to identify ride trends.

Once the association between, for example, the seat and the rider has been established, the data is communicated to the server prior to commencement of the ride. Download can be implemented by placing the scanner in a cradle and downloading stored associations through a data connection between the scanner, cradle and system controller 24, or otherwise the scanner can be integrated with a RF transmitter that operates to send (e.g. in one or more burst transmission) the association to a receiver at the server at the time of the scan or at a predetermined time (e.g. after scanning an entire car).

Optionally, to avoid the potential for a missed association, a preferred embodiment has a fixed and accessible RFID tag or bar code for the car or row (and thus an association with at least one dedicated camera) and also a scannable or readable reference plaque for each seat. This means that an unoccupied seat can also be scanned to permit the system (and particularly control logic in the server) to account for each seat during each ride event. Preferably, the scanner or reader used by the ride attendant is configured to require that each seat to associated with either a rider (i.e. a rider's RFID or unique identity) or with a default "empty seat number", with the scanner not allowing entry of additional associations until a predetermined sequence has been entered.

As a practical example of this embodiment, the ride attendant starts by scanning/reading the RFID tag or reference associated with "Car 1, Row 1". Let us assume that the first rider has the unique identity "Michael 123". The ride attendant checks the harnesses of the riders and, at the same time, records the RFID of the first rider as being associated with outside "Seat A". The association of the unique identity "Michael 123" is now logged by the system as being associated with the camera that covers Car 1, Row 1, Seat A for ride X at time Y. The middle seat ("Seat B") besides the first rider is unoccupied, so the ride attendant is forced to scan the default reference tag, bar code or the like associated with the middle seat. The system is then able to recognize that the middle seat is empty because the default reference tag is recoded against Car 1, Row 1, Seat B for ride X at time Y. The attendant is then only permitted to scan either the default reference of an inside seat ("Seat C") or otherwise the unique RFID tag or ticket of the rider occupying seat C in Car 1, Row 1. Once the first row is completed, the ride attendant is then forced by the system to scan the RFID tag or reference associated with "Car 1, Row 2. The process continues in this fashion until the entire all seats have been either being empty or associated with a rider. Of course, if an entire car is empty, the system may be set up to permit a double entry of the car reference identity separated by a time delay and a software-driven system prompt from the scanner/reader; this permits expedited or timely commencement of the ride. Individual seats, individual rows or individual cars may be subject to a scanning regime, with the level of granularity decided by the operator.

Figure 3:
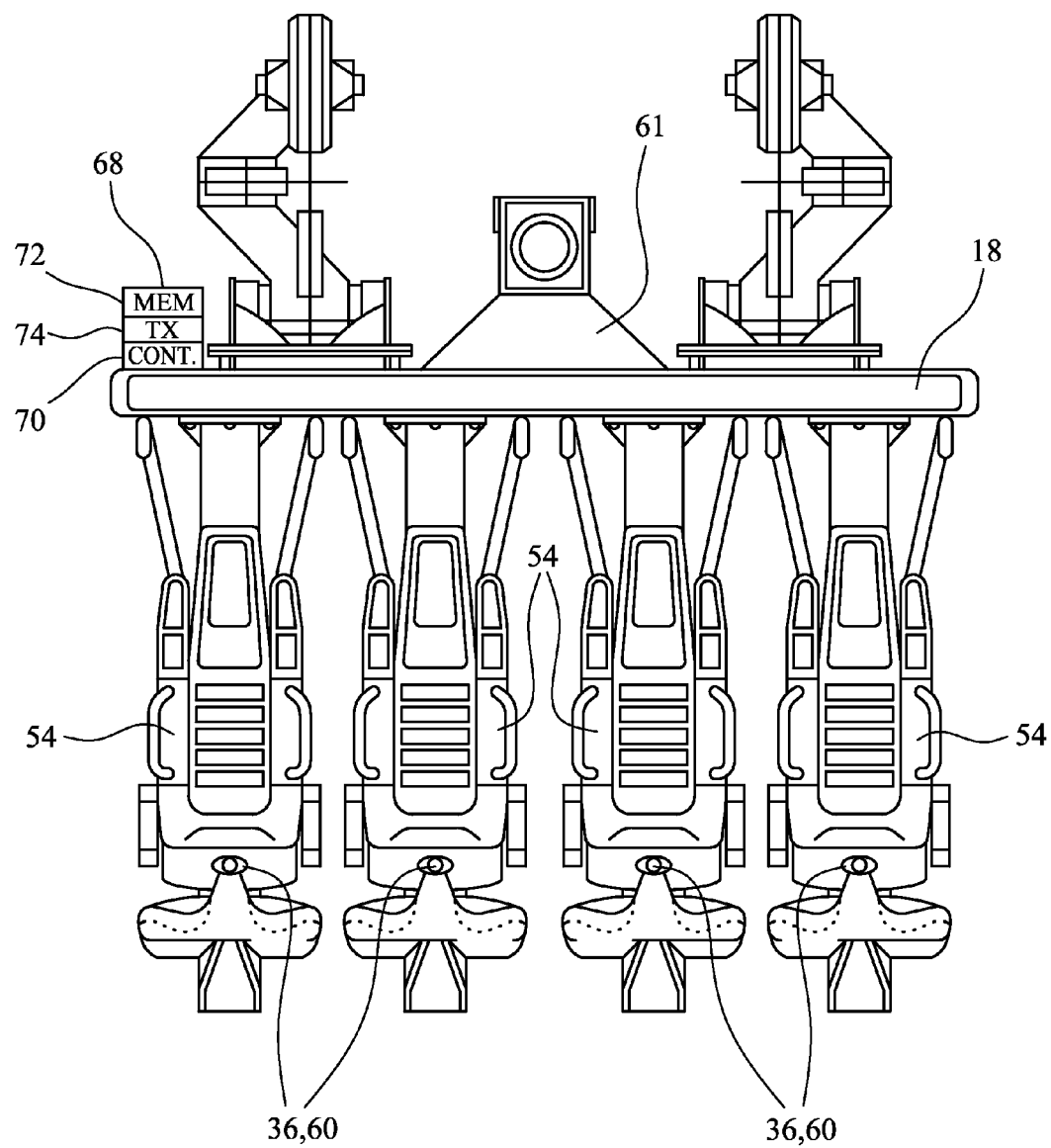
FIG. 3 is a multi-seat ride car of a funfair ride, the carriage including components from the preferred system of FIG. 1.

With reference to FIG. 3, a ride car 18 is shown to include multiple (in this case four) identical seats 54 in a given geometry. FIG. 3 shows a row of seats in an inverted ride car configuration in which the track 16 is above the heads' of the riders. The nature of the ride car 18 is, as will now be appreciated, merely a design option and its configuration may therefore change according to free design or choice.

In FIG. 3, four individual cameras are provided, with each camera 36, 60 associated with a particular seat. Of course, the number of cameras per seat is optionally and be both fractional (i.e. one camera to two seats) or multiple (i.e. two or more cameras per seat that have different, but complementary, fields of view).

FIG. 3 furthermore typically includes a control box 68 that preferably houses and protects a camera controller 70. The control box also preferably includes a local memory 72 for storing recorded images against specific camera input (and thus against specific ID codes 51 for specific sensors 50 and specific seats 54). The memory may take a number of alternative forms, including (for example) FLASH, RAM or disk storage. Of course, the individual cameras may themselves store captured image data, but this is optional or complementary to discrete local memory storage 72. The cameras in FIG. 3 are therefore generally coupled to the local memory 72 to permit selected uplink transfer of captured data from any active camera. Connection of the cameras 60 to the control box 68 (and particularly the camera controller 70) is typically hard-wired, although this is a design option.

The control box 68 also generally includes a transmitter (or a transceiver) 74 that is selectively operationally responsive to the camera controller 70 and/or the system controller 24.

During a ride, cameras placed trackside (and therefore outboard of the ride car) can be triggered by the approaching ride car. For example, one aspect of a preferred implementation causes an outboard camera to be rendered operational upon detection (by the outboard camera system) of a unique identity (e.g. an RFID tag identity) of an approaching ride car. If the outboard camera is a digital "stills" camera, the camera may be configured to fire off a succession of frames to capture discrete rows of the ride car as it approaches and/or passes the outboard camera. If the outboard camera has video capabilities, then video is shot during the time the ride car is deemed to be in frame. Captured images are then communicated back for editing, with the captured images cross-referencing (at least) the ride car ID; this allows the relevant images to be associated with the rider(s).

Once a ride has been completed, stored images (i.e. captured data 28) from the memory 72 are downloaded to the data recovery unit 34. Instantaneous download from the camera(s) 36, 60 is also contemplated, although this increases the complexity of the camera 36, 60 or control box 68 is generally considered unnecessary because image review by the rider/client 52 occurs only after disembarkation.

Preferably, once the ride car 18 is stationary at the kiosk 20, captured data are taken from the memory, e.g. by physical removal of a memory device used to record the images or otherwise by a transmission scheme, including RF and wired alternatives. More specifically, the system controller 24 operates to store captured data in the database 26 and furthermore to cross-reference the captured data to the client reference information 30 (and ID code 51).

In this way, captured data 28 can subsequently be either sent to the rider 52 by making use of the client reference information (e.g. an e-mail address or to a cell phone that has previously been registered with the controller) or the rider can make use of either their ID code and/or their personal client reference information to review the captured file (e.g. through a secure website page on the internet). In this respect, reference is again made to FIG. 1 in which there is also shown a network 100 coupled to the system controller 24. The network may be the internet and can provide communication access to a personal computer 102 of the rider. The network 102, which might be a local area network or a wide area network, may provide access to a wireless base station transceiver 104. By gaining access to a radio-based air interface 106 (through the base station controller 104), the system controller 24 can effect the sending of packets or burst of captured data to a personal telephone or PDA 108. The address of the PDA 108, as will now be appreciated, is already registered in the camera, registration and data delivery system 12 by virtue of the initial registration process at the registration terminal 22 and the storage of the client reference information in the database 26.

Subsequent review of the captured data 28 can take a number of forms. Specifically, selective and initial download may by initiated by the system controller 24 using the stored client reference information 30; this may be reduced to a simple paging message reminder which includes a reminder of the log-in code. Alternatively, the client may themselves initiate full or partial access through a web-based log-on scheme (or via a text message on a phone) that makes use of the earlier cross-referencing and/or assigned ID code 51 and/or their client reference information 30.

Once a review communication session has been established, the system controller 24 can communicate captured data in one of a number of ways:

i) in a streamed fashion that prevents storage of the data stream at the client's PDA 108 or computer;

ii) in a reduced bandwidth form that provides a flavour of the captured data 28, but limits quality or quantity of communicated images data to encourage subsequent purchase of a high-quality file;

iii) as a full bandwidth, burst transmission in which high quality images are water-marked to limit use;

iv) as a time-spliced file of non-contiguous images that provide a flavour of the entire recorded content, but in which images are at randomly or predetermined ride image points, e.g. start and finish frames; and v) as a one-time download whereby a flag is set in database 26 against further review, but which flag can be lifted subject to receipt of a payment by the client.

The rider/client may also view the video stream to identify and flag a specific frame (or portion of a frame) that is required for printing; the identity of the frame is then retuned to the system controller 24 for processing/editing purposes and the related client record updated in the database 26.

During the review communication session, the rider/client is permitted to order an unrestricted high, quality version of the captured data through on-line payment or the establishment of a line of credit. Pre-payment for captured data 28 is also possible, with pre-payment guarantees referenced against the client reference information 30 and stored in a separate accounts database, such as ancillary database 32.

Final delivery of the captured data 28 to the client may take a number of forms, including printed (still) images and data files presented in a suitable video format (such as MPEG and the like). Data files may be protected as "read only" files, and may be supplied over an air-interface, infra-red or wire-based, packet systems or otherwise on suitable media, such as a DVD or memory stick. Uses of the downloaded data may extend to screensavers or wallpaper for personal computers and other graphic user interfaces, including displays on PDAs and the like.

The system controller 24 therefore also operates to control delivery and production format based upon client input obtained either at the time of registration or during the review communication session.

In another embodiment, it is contemplated that the sensor 50 is replaced by the rider's own telephone ID and that this telephone ID is directly used as the cross-referencing point for client addressing and storage captured data. More particularly, the rider 52 may make use of the reference plaque 62 on or proximate to the seat to identify a camera identity printed on the plaque 62. By sending to the system controller 24 a text message which includes the camera ID, both the address of the telephone is identified by the system controller 24 and, furthermore, recorded and cross-referenced in the database 26 against the camera ID. The system controller 24 or the rider can then make use of the telephone ID to review and order images captured during either the duration of the ride or over a predetermined period of time for the ride. In this embodiment, the detector at the camera is unnecessary, although the system is then reliant upon the rider's memory. However, the ride car may compensate by generating an alert to advise the rider of departure and, additionally, to remind the rider that they have, for example, 2 minutes to effect a registration process.

As a further alternative, with a pre-existing relationship established between seats 54 and associated cameras 60, local cameras (or their associated local controllers) can be configured to support an interactive and seamless registration mechanism based, for example, on the iClouds system. The iClouds system is outlined in the paper "iClouds: Peer-to-Peer Information Sharing in Mobile Environments" by Andreas Heinemann et al (URL: http://iclouds.tk.informatik.tudarmstadt.de/iClouds/pdf/europar2003.pdf), which paper and communication technology is incorporated herein by reference.

The iClouds system describes the interaction of people in ubiquitous computing environments in which information is shared between devices (such as wireless PDAs) based on device settings called "iWishes" and "iHaves". It will be understood by the skilled addressed that iClouds-enabled devices are operable to scan periodically its vicinity to see if known nodes are still active and in communication range and also to see if any new nodes have appeared. Information about active nodes is stored in a data structure called the "neighborhood".

By having local transmitters in ride cars 18 communicate iHave capabilities relating to image capture associated with a seat 52 in a specific ride, and with the rider pre-selecting (in their own phone settings) an iWish desire for image capture, transparent registration of the rider with the system is achieved. Image capture during the ride is then accomplished as described above, whereafter the system controller 24 can page or call the rider's phone to permit access to the captured data 28 (that has been automatically cross-referenced to the rider's phone). Alternatively, the iCloud interaction communicates the camera ID and time (or other unique identifier) to the iClouds enabled PDA to permit the rider to access the captured images by using the unique identifier. The present invention therefore makes use of the so-called mCommerce capabilities of iClouds technology. In this way, a rider can effectively register with all cameras/ride in an entire theme park by simply setting the iWish entry for image capture at any point, e.g. on the day or during the day or before the visit to the theme park.

Figure 4A:
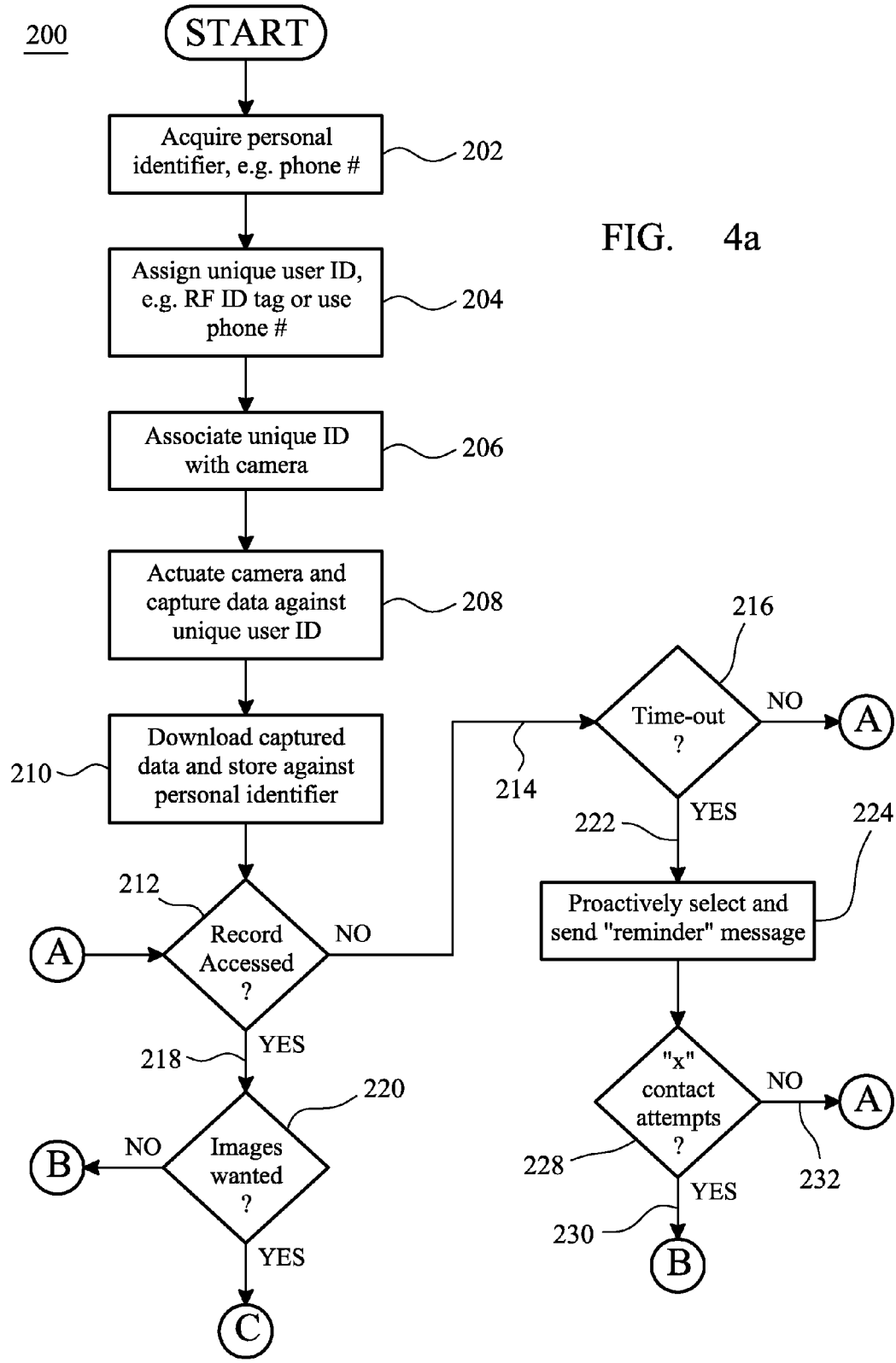
FIGS. 4a and 4b show a flow diagram of a preferred registration and data recording and delivery process implemented in the system of FIG. 1.
Figure 4B:
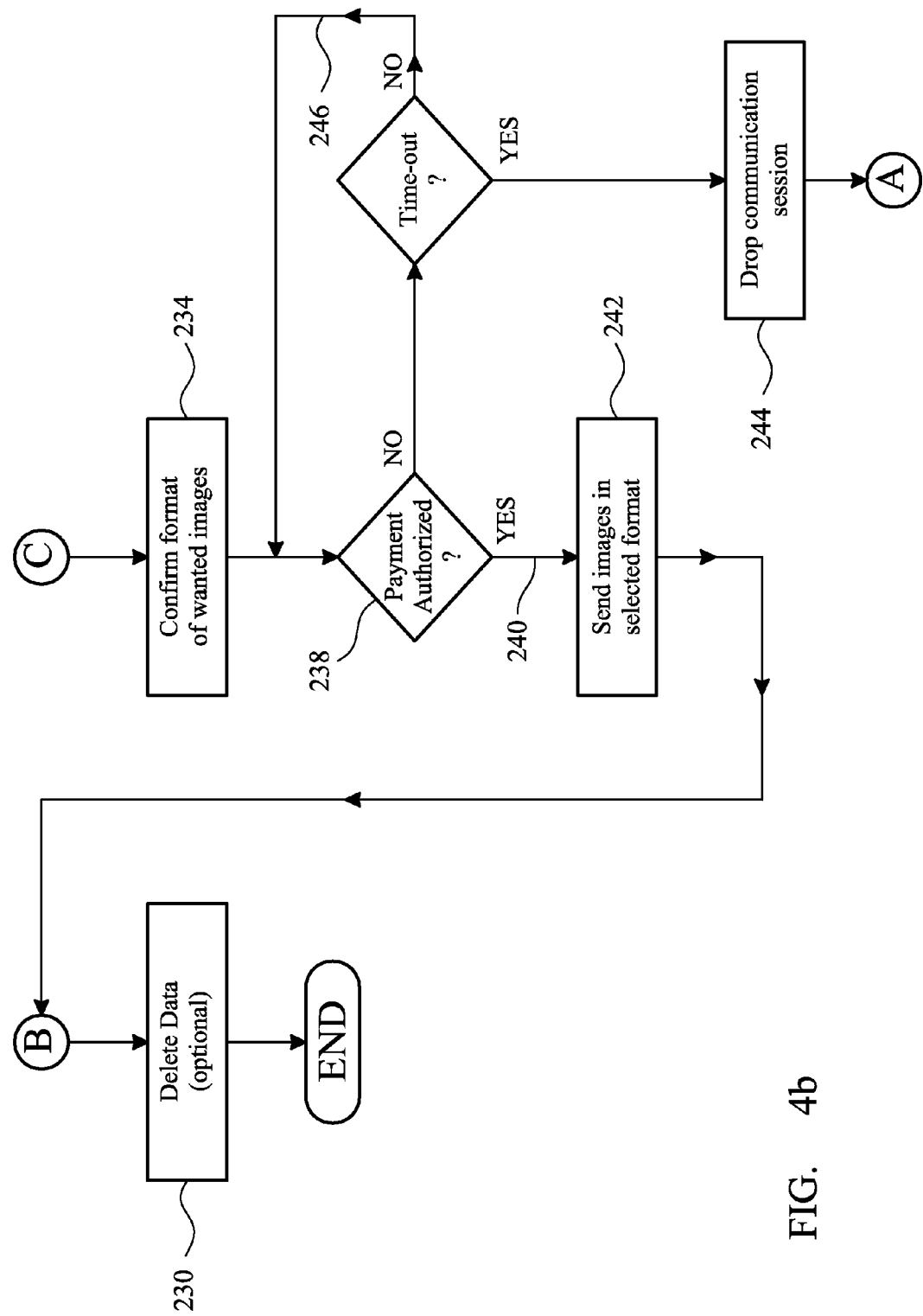

Turning to FIG. 4, a flow of a preferred registration and data recording and delivery process 200 is shown.

At step 202, the system operates to acquire a personal identifier, e.g. a phone number, an ESN of a cellphone and/or a mailing address; this can be accomplished by keystroke entry at the registration terminal 22 or automatically. At 204, a unique user ID (e.g. an ID code 51 or the rider's/client's phone number) is assigned. A physical realization of the unique user ID may be provided in the form of a passive RFID tag or active sensor 50. Association of the unique user ID with a specifically identifiable camera occurs at 206, with the interaction between the camera 60 and sensor 50 preferably being automatic and based on local detection of the rider/user 52 in the vicinity of the camera 60. At 208, the (at least one) camera is activated and data is captured against the unique user ID. At an appropriate point (which may occur immediately or after a predetermined delay, image capture begins and captured data is stored 210 against the personal identifier. If necessary, download of captured images/data from temporary storage in the vicinity of the seat can occur, which download is to database 26.

Data collection for the ride/event is now complete and the camera can be re-set for the next client.

In relation to recovery, the system provides secure access to the captured images/data. An assessment 212 is made as to whether a specific record has been accessed. In the negative 214, the system controller determines 216 whether sufficient time has elapsed ("time-out"). In the negative, the system returns to steps 212 and 216 and waits.

In the event that the record is accessed (step 218), it is determined whether the rider/client wants images.

In the event that no access to the record has occurred after a predetermined period of time 222, the system controller 24 proactively selects and sends 224 a suitable reminder message (which may include access details and/or picture information). If the specific record is not accessed 226 following a predetermined number of contact attempts 228 (e.g. two reminder messages sent to a cell phone in a GPRS format), a decision is made as to whether to keep or over-write the specific captured data and, if appropriate, the stored data is deleted 230. If another attempt to contact is deemed appropriate 232, the process returns to step 212.

In the event that the record has been accessed and images are not required, a decision is made as to whether to keep or over-write the specific captured data and, if appropriate, the stored data is deleted 230. If captured images are required, the system controller 24 establishes/confirms 234 the format of the wanted images.

At 236, the system controller 24 determines 238 whether payment has been authorized/made. In the affirmative 240, the images/data is sent 242 to the client in the appropriate format and a decision can then be made as to whether to delete the captured data and record 230. If no payment is authorized (either by refusal or time-out), the communication session can be dropped 244 and the process returned to step 212. Alternatively, additional time 246 can be granted to complete a financial transaction with a third party financial institution or server.

In relation to the supply of ID codes, it is preferred that these are supplied in the forms of polyester wrist bands (or the like) that incorporate RFID or bar code technologies. More particularly, an embodiment of the wrist band includes frangible sections that, once assembled into a loop about the rider's wrist, permit the loop of the band to be broken; this is a safety consideration for high speed rides and prevents the band from inappropriately restraining or catching the rider's arm. Additionally, a secondary function of the wrists bands is to establish a line of pre-paid credit against a particular ID code. In this way, the RFID or bar code can be scanned at ride entrances (e.g. kiosk 20) and a centralized computer function (at the database 26) checked either for validity of the wristband or whether sufficient funds are available to permit the wearer of the wristband to participate in the ride. Consequently, ID codes supplied on wristbands (or the like) are tailored at, for example, the registration terminal 24 at the time of their delivery to the rider.

Once client contact point (e.g. a cell phone number) is established in the system, an embodiment of the invention permits the registration of multiple ID codes 51 to each contact point. In this fashion, a family can be provided with a plurality of individual RFID wristbands (or the like), with each wristband permitting capture of images from individual cameras at the same time and at different locations in the theme park (or the like). All related sensor ID codes are therefore consolidated to a single contact point record that is set up at initial registration.

Since the registration process makes use of the mobility and unique identity provided by electronic addresses or coded IDs (including RFID codes, cellular phone numbers and electronic serial numbers) the terms "personal mobile telephone number" or "cell phone number" or "mobile device code" (and variations and equivalents thereof) should be construed broadly and functionally, rather than narrowly and specific to a particular form of implementation.

In another preferred application of the currently proposed system, uniquely identifiable cameras are located within both a racing car and at strategic points besides a raceway or race track. For example, a race car might include one or more cameras, with one having a filed of view focused on the upper torso or face of the driver and another pointing out of the windscreen. In terms of the race track, multiple cameras are also strategically placed at bends or chicanes and at the entry and/or exit of the pit lane or garage.

In a similar fashion to the fairground ride described above, a driver (rather than a rider) is provided with a RFID tag or other identifier, such as a readable smart card or coded bar-code. The term "RFID tag" should therefore be construed broadly and is not limiting. The function of the RFID tag is to provide a unique identity that permits tracking of the driver within at least the car. The unique driver identity permits cross-referencing of the driver to related activity in the car and around the track, with the activity recorded by dedicated cameras whose output is appropriately cross-referenced against one or more drivers for the duration of the race or track day. An edited video of the driver's experience (at least within the car) is again supplied (at least in a partial fashion) to a contact address, such as an e-mail account or cell phone account, associated with the assigned driver identity.

Figures 5, 6:
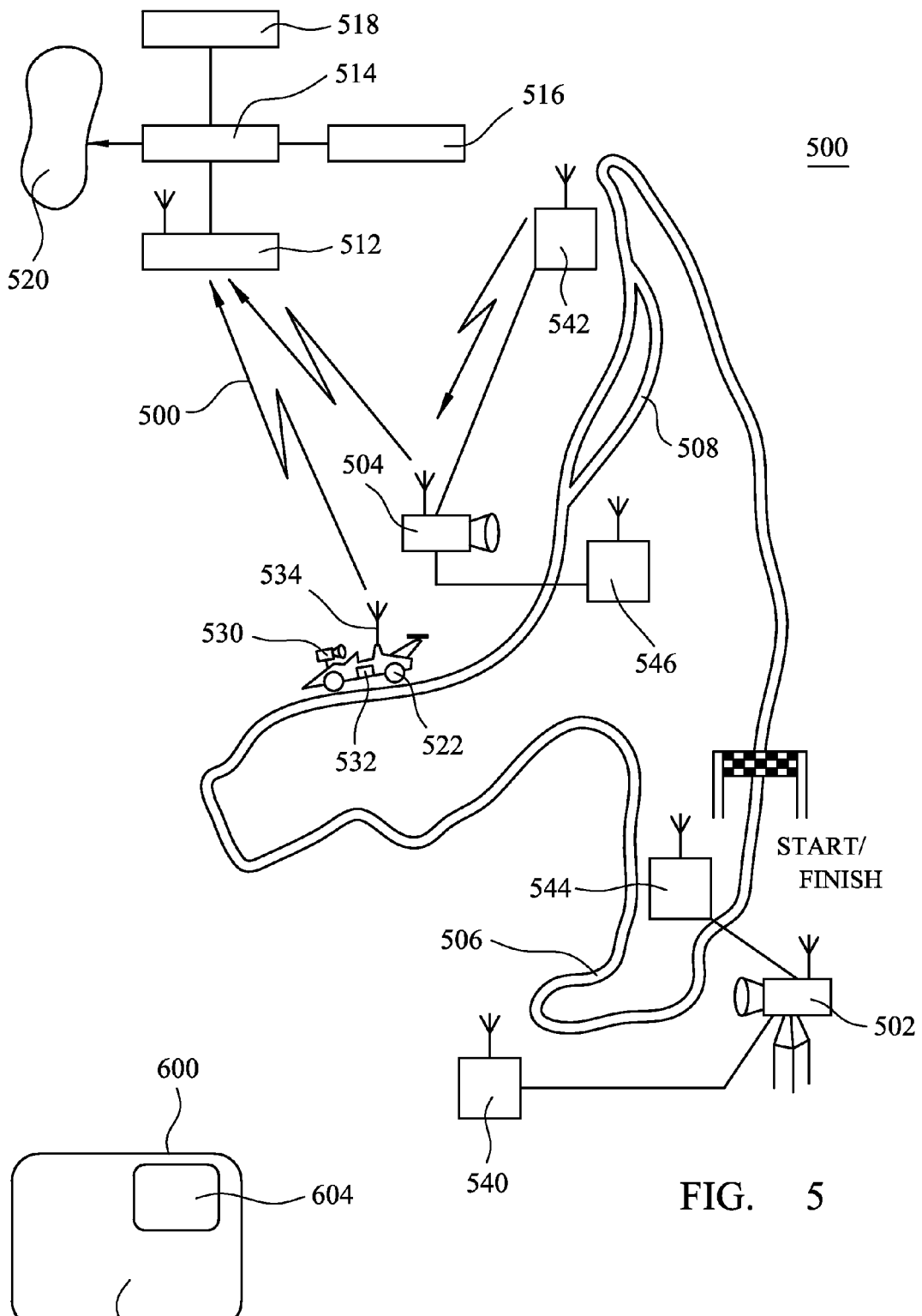
FIG. 5 is a schematic representation of a car-based video capture system in a race track environment, the system embodying aspects of the preferred embodiment of FIG. 1.
FIG. 6 is a representation of an edited image assembled from multiple camera input streamed to a server and cross-referenced into a storage database.

FIG. 5 is a schematic representation of a car-based video capture system in a race track environment 500, the system embodying aspects of the preferred embodiment of FIG. 1. The representation could, equally, apply to other environments, such as a rollercoaster or locations in which other sports or extreme sports are practiced.

A series of cameras 502, 504 are positioned strategically around the track. The cameras can be static, autofocus cameras that record video images along, for example, a straight 506 or pit lane 508. The cameras can be paired in that one has a field of view into and through an initial apex of a corner, whereas another has a field of view away from that corner.

As will be understood, the cameras may also be auto-tracking with pan, tilt and zoom (PTZ) capabilities. Such auto-tracking cameras are known in the art and produced by suppliers such as Remote Reality. For example, Remote Reality's Intelligent Omni Video Systems™ (IOVS) combines single-viewpoint catadioptric optics, high-resolution video cameras and viewing and tracking software into one fully integrated, solid-state solution.

Data recorded by the track cameras is preferably directly streamed (over a wireline or wireless link 510) to a processing centre that includes a receiver 512, including any necessary demodulation circuitry. Other forms of download are possible, but streaming is considered to be preferable in that it ensures that captured data is quickly assembled at a central processing and distribution point.

The trackside cameras will generally also include data location markers, such as a GPS receiver that records position information, to allow and effect time synchronization between each camera within the system (whether the cameras are static trackside cameras or moving cameras located within a vehicle).

The receiver 512 is coupled to a server 514 that executes control logic to control both the storage and processing of incoming data and to generate appropriate and timely associations between unique RFID tags (or equivalent electronic or coded signatures) related to an individual, recorded video images (that are referenced to position and time) and contact details. The server 514 is preferably coupled to an editing suite 516 which is typically automated and software-based. Captured image data is stored in database 518 and accessed by server 514 (or a computerized controller) to permit aspects of edited and stored data to be sent to an affiliated user, e.g. a driver. In a similar fashion to the earlier embodiments, the amount or quality of initially provided video clips can be controlled, with clips directed via a connected network 520 towards a dedicated address (such as an e-mail account of cell phone number) stipulated by the affiliated user.

The location of the processing centre is not important, although it is likely to be in the garage within the pit lane to permit timely review of video following conclusion of a race. The processing centre could also be on-board with a rider, although a remote centralized server-based system is preferred.

In the context of a track system, a car 522 (such as a saloon car or sports car) is fitted with at least one camera 530 arranged to record at least the driver's face. Preferably, two cameras are associated with the car and have different fields of view that focus on the driver's front torso and a track view through at least the windscreen.

In operation, the driver is provided with an RFID tag or other unique identifier, such as an encoded wristband, card or sensor. The RFID tag therefore corresponds to the sensor 50 previously described in that it contains a unique identifier (ID) that relates to the driver. The sensor/RFID tag is not shown in FIG. 5 solely for the reasons of drawing clarity, but its presence should be assumed. The sensor/RFID tag can be an active or passive sensor.

The car 522 also includes an RFID tag 532. The car's RFID tag 532 is typically an active tag. The car's RFID tag 532 also includes a unique vehicle identifier.

Functionally, as the driver enters the car 522, the drivers' tag/sensor 50 is read by a local in-car reader (not shown). Such RFID tag readers are readily known to the skilled address and need no further explanation. Alternatively, if the unique identifier is a coded ticket or smart card, a suitable scanner is used to acquire the unique identifier, or the driver enters a unique code into a keyboard to record his unique identity.

The car's RFID and the driver's unique identity (i.e. from the sensor 50 or even their cell phone ESN, for example) are therefore linked at the point in time when the driver enters the car and after notification and storage of this association by the server 514. The resulting association permits storage and cross-referencing of subsequently recorded video content and related data both against the driver's ID and also to related driver details, such as a supplied e-mail address or phone account.

Information recorded by camera(s) 530 in the car is therefore tagged with the unique identity acquired from, preferably, the driver's sensor before being sent to the server 514 over an active communication link. Since encoding the RFID (or other unique identifier) requires only a few bits per frame, it is preferred that both the car's RFID 532 and driver's ID are communicated; this provides for easier tracking and cross-references and also provides some degree of redundancy protection. However, once an association is established and recorded between the car's RFID 532 and the driver's unique ID, either can be used and encoded to cross-reference streamed video sent to the server 514 and stored in the database 518. Stored video content can then be subjected to editing based on, for example, time triggers inserted into the streamed and encoded uplink data or just active picture content related to a particular driver or car.

The car 522 therefore includes a limited amount of support hardware and software 534 that operates to read RFIDs and to control video streaming, including appropriate modulation, encoding of the identifier and transmission. The exact nature and configuration of the hardware (such as a transmitter chain) and software (such as signal processing and control software) will be readily understood by the skilled addressee since the components and techniques are well known in the communications arts. Any appropriate form of transmission may be employed, e.g. packet transmissions in a CDMA frame (for example).

As the car 522 is driven around the track 500, the tag on the car's RFID tag 532 is preferably used to link the car ID to the video being streamed both from the car and from elsewhere, as will now explained.

With respect to track-side cameras 502, 504, these are preferably arranged selectively to record and uplink streamed video to the server 514. In a preferred embodiment, this selective streaming is tied into proximate location of identifiable cars. Specifically, by making use of the car's RFID and encoding this ID into uplink streamed video content, video from the track-side cameras can also be cross-referenced in the server 514 to the driver. Consequently, the system allows for contiguous or time-stamped events to be recorded from within the car and from the track to permit these different video sources to be spliced together automatically by the editing suite 516.

Briefly referring to FIG. 6, there is shown a representation 600 of an edited image assembled from multiple camera inputs streamed to the server 518 and cross-referenced into storage database 518. Editing may take into account multiple simultaneously recorded images and these may presented as a primary image (for display of a principal display 602) and secondary image 604, e.g. realized by a "picture-in-picture" effect. Over time, the camera source for the primary image may be changed between track-side and in-car cameras, with the change controlled during editing, e.g. subject to detection of encoded streams from the track-side cameras. Editing control may also be surrendered to a third party by making the streamed video feeds available over the network 520; this has the advantage of removing the requirement for the optional editing suite 516. In overview, since the streamed video is cross-referenced to a unique ID of a specific driver and/or car (as the case may be), access to the stored data is therefore possible through the use of either that ID or the driver's stored e-mail or phone number details.

In a preferred embodiment, streaming of video from track-side cameras is controlled by selective and timely activation and deactivation, although continuous streaming is also contemplated. Preferably, therefore, an exciter is used to trigger the commencement or termination of image capture. In a preferred embodiment, as the car 522 enters a predetermined position on the track, the on-vehicle RFID tag 532 is forced to transmit both its own ID plus an exciter ID. Receipt of this transmission by a local detector, such as first or second activator 540, 542 or first and second deactivator 544, 546, causes the respective activator or deactivator to notify an associated camera to start or stop image capture and streaming. The activators and deactivators may make use of wireless or wired transmissions to notify the associated camera of car detection. If the car and/driver ID are into the uplink streamed video, then the server 514 and editing suite 516 can assemble a dedicated video programme of relevant images. Streaming of video to the server from the track-side cameras is then timed and cross-referenced to the pre-stored driver data.

As will now be anticipated, controlled shut-down of track-side video capture can be controlled as the car 522 passes a second predetermined point, e.g. through the use of a second exciter or simple time-out. At this point, the car or driver ID is not included in the uplink stream.

The result is that streamed video received at the server from the track-side cameras is also linked to the car's RFID 532 and thus to the driver's identity and file by virtue of the earlier recorded association.

It will be understood that uplink streaming of track-side-captured video from track-side cameras 502, 504 can be continuous. Once received at the server 513, any streamed video feed that does not contain an encoded ID from a car can be ignored or deleted, since the recorded content is likely to be of only marginal significance to the driver. It will furthermore be understood that a video stream from an external, track-side camera may simultaneously include multiple unique identity codes associated with multiple cars and/or drivers. Multiple codes on each video stream can arise when multiple cars trigger the activators at substantially the same instant or in quick succession, although relative speeds of the cars are likely to result in different captured content for different cars from the same camera. Putting this differently, a start point might be ostensibly common to several cars (e.g. the start of the race), but a first car may pass the deactivation point sooner than a second card so the uplink stream will suppress uplink encoding of the first car's RFID earlier than that for the second car (and so on). The system therefore is able to tailor content to the skill of each driver and no two video will be common When the vehicle arrives back in the pits the act of the driver leaving the vehicle is identified as their unique identity tag (e.g. sensor 50) is no longer read by the in-car system and the server can be informed that the ride is completed. Specifically, in a preferred embodiment, the in-car reader no longer registers the driver's RFID tag and so the in-car reader can notify the server of timely disassociation. Alternatively, rather than have the reader look for a loss of detection, the driver may positively terminate their association with the car by, for example, removing the ignition key. Removal of the key acts as a trigger event that causes the reader to notify the server that a disassociation has occurred and that video capture can be terminated (at least temporarily).

In summary, throughout the time between entry to and exit from the car 522, all the video is preferably streamed back to the server 514 for storage. The server 514, which is configured and programmed to build a complete video package, is then able to complete this exercise by calling on the encoded ID references in the streamed video. The assembled video programme can then be either downloaded in a DVD format (or the like) or otherwise made available to the driver's mobile phone or web-account/log-in page.

It is further contemplated that the images of the co-driver or passenger may also be captured into a personalized video. This merely requires the co-driver or passenger to have a different identity that is initially linked to the car's identity and then to the various video streams over a period of time.

The RFID embodiment is particularly suitable for enclosed environments, such as an indoor karting track.

The underlying concept of tagging the user and associating collated image data for onward supply to a rider's e-mail account or WAP-enabled phone (for example) can be further augmented through the use of location data from a positioning system, such as a satellite-based global positioning system (GPS) or its functional equivalent. In other words, the RFID aspects of tracking can be replaced (or augmented) with a position-based data stream that uniquely identifies the position of an individual (or vehicle, for example) relative to a series of static and/or mobile cameras having known position information and a corresponding synchronized time stamp, such as from a common GPS satellite. Time stamping avoids having to provide and detect a common synchronization pulse, such as used in TV studios to synchronize a number of cameras.

For example, a rider's unique identity can be associated with position data to allow for movement and the tracking of the rider, driver or participant (as the case may be). More specifically, in the exemplary context of the race car of FIG. 5, in the event that at least one fixed outboard camera location is known to, i.e. stored in application software or memory, an in-car GPS system, the in-car GPS system is able to identify when the strategically-placed outboard camera is being approached by the car and thus that a video/ photo opportunity is imminent for the associated and uniquely identifiable driver. The in-car GPS system is therefore associated with the RFID tag, typically through a wired or Bluetooth connection.

Preferably, the in-car GPS system is configured to identify both the location/point at which the car enters the field of view of each outboard camera and the location/point where the car leaves the field of view.

A controller within the car provides data processing and data storage capabilities, including the exercise of local functional control, e.g. RFID reading and video capture to an associated data file cross-referenced in time to the RFID associated with the driver and the unique ID of the car/vehicle.

To provide a cross-reference in time, a clock associated with each in-car GPS system may be synchronized to a master clock associated with the outboard cameras. Synchronization can be checked and, as appropriate, re-set when the car returns to the pit lane 508 at the end of the ride, for service or otherwise to effect download on data/images recorded and stored locally by the controller in the car, As the car 522 is driven around the race track, the in-car GPS system and controller cooperate to record inboard camera action from at least one inboard camera. The camera data is stored and time-stamped. Outboard cameras also stream (or otherwise record and communicate) images back to the server 514, with these streamed images also time-stamped. When the two discrete data sets are uploaded and assimilated in the central server 514, the synchronicity between the time-stamps can be used to edit and assemble automatically a spliced version of the in-car and outboard video footage against a user identity.

In one particular embodiment, the steamed video (whether inboard or outboard) includes GPS position data and a time stamp. Also, the position of the individual is tracked by the positioning system and the position information is also time stamped. The streamed video and the position data related to the individual are recorded, communicated to the server/editing suit and initially stored as individual files. Once centralised, these individual files can be time-spliced together based on the GPS position to produce a movie because there is a direct association between the subject and the cameras both in recorded time and position.

Thereafter, the system can make video data available on an access or proactively driven basis, such as generally outlined by the process steps 210 onwards of FIG. 4.

As an alternative, the outboard camera can be arranged to provide streaming of live images (over a WiFi RF link) directly to the in-car controller. In this embodiment, the in-car GPS-system identifies when it is approaching the known GPS location of the outboard camera and automatically configures the in-car system to insert the externally filmed video footage being captured by the outboard/trackside cameras. At an egress point of the field of view of the external camera, the in-car controller switches back to image capture from internal cameras within the car. The egress point of the field of view can again be determined by pre-set GPS position data stored locally by the in-car controller. In this way, a fully composed video track is assembled by the in-car controller and this composite track can then be uploaded to the central server 514 and cross-referenced to the driver's pre-stored identity.

It will be also be appreciated that whilst GPS position data is used to effect a switching back to the in-car cameras, the initial transition that splices in the externally captured footage could also be brought about by identified reception of a local RF transmission from the external camera. The skilled person will therefore appreciate that the trigger point can be set in many ways. Also, with the automatic assembly of a composite video containing in-car and external images, time-stamping of the recorded image is optional.

A further application of the video acquisition and delivery system of a preferred embodiment of the present invention is within a skiing environment. More generally, this embodiment of the system again makes use of an assembled video that is individually cross-referenced and made available (as generally described by the process steps 210 onwards of FIG. 4), but the infrastructure allows for random movement of the user in time across, for example, a mountain. The infrastructure could be employed in other environments where the path of the individual (e.g. a climber or a rafter or canoeist) is determined over time by the individual. In a similar fashion to the race track scenario described above, a GPS-based system that is time-stamped is used to assembly a composite video from multiple streamed external camera outputs.

Figure 7:
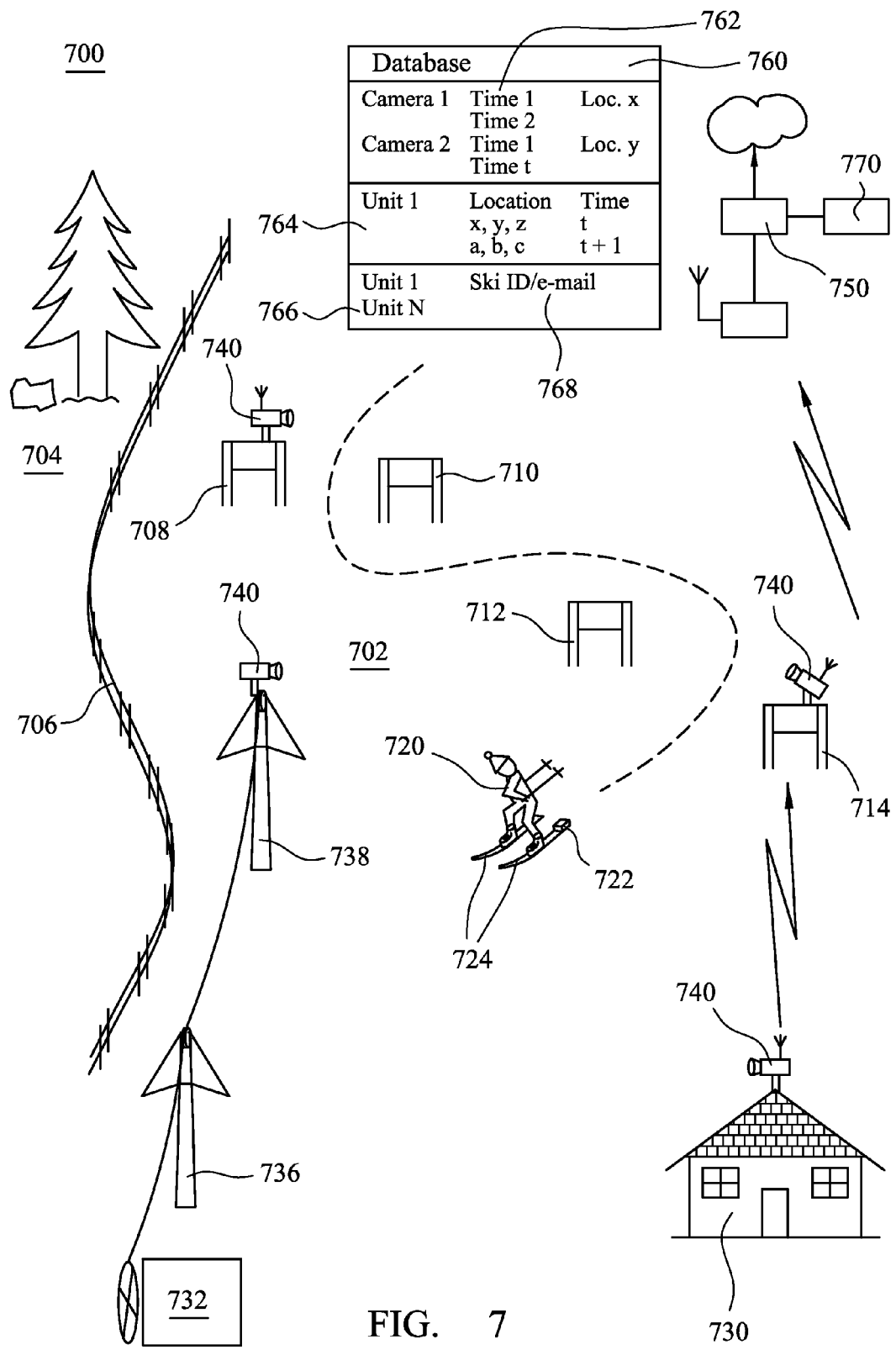
FIG. 7 is a representation of a GPS-based video acquisition system according to another embodiment of the present invention.

With reference to FIG. 7 there is shown a schematic representation of a GPS-based video acquisition system 700 according to another embodiment of the present invention. For reasons of explanation only, the system has been described in the context of a ski resort having a prepared piste 702 separated from an off-piste area 704 by a safety fence 706. The piste contains a plurality of gates 708-714 through which a skier 720 may wish to ski. The skier is provided with a GPS location and tracking unit 722 shown attached to one of a pair of skis 724, although the GPS location and tracking unit 722 may be worn or otherwise carried by the skier 720. The mountain resort may have a chalet restaurant 730 and a lift station 732 including pylons supporting a drag lift, cable car or the like. The GPS location and tracking unit 722 has (or is provided with) a unique identity that it recorded against the skier (in an analogous fashion to the RFID tag and the rider of FIGS. 1 and 2 described above). Indeed, the GPS location and tracking unit 722 may include an integrated RFID tag. The GPS location and tracking unit 722 is designed or configured to record location against time, thereby providing a tracking function for the skier 720.

The GPS location and tracking unit may include additional functionality beyond just position, e.g. it may include a controller and related memory for use in orchestrating operational control of the on-skier electronics, RF (if applicable) and video processing functions. However, the exact nature of the package of hardware, software and firmware is a design option, as will readily be appreciated by the skilled addressee.

A multiplicity of cameras 740 is located within the system. The cameras can be located on the gates, pylons, rooftops or other deemed suitable locations (including, if appropriate, on the skier). The cameras are arranged to have specific fields of view that cover various aspects of the piste, including the gates. The position of the cameras is known, e.g. through the use of a local GPS receiver on the fixed camera or otherwise as measured and recorded. The cameras are furthermore arranged to stream or otherwise communicate or transmit images back to a central server 750, which images are time stamped (as previously explained in relation, for example, to one or more the race track embodiments of FIG. 5). Streaming is preferably in real-time and continuous over dedicated WiFi links from each camera, although this is a design option.

In operation, streamed images are time stamped and recorded in a database 760 coupled to the server 750. The database 760 records image location and synchronized time 762 for the various cameras. Additionally, the database 760 is uploaded with time and position data 764 from the GPS location and tracking unit 722 associated with the skier. Uploading of the skier data 764 may be undertaken at any suitable point, such as at the end of the day or week or otherwise at strategic points in the day, such as at the ski lift 732. The uploading of skier data may make use of any suitable mechanism, including wireless or wired connections. It will be understood that it is important only that the position and time data is recovered and entered into the server 750 to permit the skier's position and time to be tied and synchronised into recorded images captured from the fields of view of the various cameras at each of their known positions at specific times.

An edit suite 770 associated with the server 750 is typically realised by software. The edit suite 770 allows for a composite video to be automatically assembled and stored based on position and timing information. The composite video is furthermore cross-referenced and tailored to a specific individual in view of the fact that each GPS location and tracking unit 722 has a unique identity 766 that has itself been recorded against a unique trace account 768, e.g. an e-mail address or WAP-enabled cellphone, belonging to the skier 720. The assembled video may therefore be made available by the server 750 over a wide area network (WAN) and/or local area network (LAN) 780.

Whilst the position of the cameras 740 has been described in relation to ski gates, it may be preferable to locate the camera across the piste or external to the piste to avoid potential collisions between the skier and the camera equipment. The field of view of the camera can, of course, be focused to a general region around the gate or optical and digital processing may concentrate the field of view on a very specific area through a zoom function. Auto-tracking cameras are a preferred feature in such a dynamic environment where the exact path of the skier can vary according to the skier's personal choice; this contrasts with the general route dictated by a race track or rollercoaster track.

The skier may also be provided with a local or principal camera integrated into the assigned GPS-system, although this is optional. In this instance, externally shot video content can, if desired, be spliced directly into onboard video captured from the local/principal camera. External video content can be acquired at and then processed and then stored by a local controller (such as a code-driven microcontroller with an associated digital signal processor). In a similar fashion to the mechanism described previously for the dynamic splicing of external video content for an in-car system, a WiFi burst transmission from relevant, locally significant external cameras may make use of GPS positioning data to control the point at which the external video content is accepted and/or rejected in favour of local onboard content captured in the field of view of the principal camera. More specifically, the GPS-system is pre-programmed to be aware of the location of external cameras (and their effective fields of view) and can use this memory-based data and its determined current position to effect switching between principal and external video sources. Time splicing may occur marginally in advance of the GPS-tracking unit determining that it is about to enter to a boundary of the field of view of a specific camera.

Of course, streaming back of captured video content to the server 750 may also continue, if desired. Such streaming of time-stamped video content would therefore act in a redundancy capacity to preserve captured data should a malfunction occur at the on-skier GPS-system.

Again (as will now be appreciated), with fixed cameras the initial splicing can be based solely on detection of a local RF channel that streams the externally-acquired content rather than an actual GPS position, although GPS positioning (or the like) may be used to terminate the inclusion of external content after the skier is out of frame, i.e. passed a certain physical point that is out of shot of the external camera. Of course, the use of position data to assemble relevant video is considered a more reliable option since the on-skier GPS-system has definitive knowledge about on position and thus a better understanding of when exactly to switch between different sources, i.e. the GSP-system is aware when it is or is not within the field of view of a particular external camera.

The video capture system of FIG. 7 may therefore make use of the dynamic splicing of video content between principal and external cameras (as previously described in to the context of the in-car system). In this way, the composite video is assembled and stored with the principal camera, i.e. with the skier. The centralized editing suite (reference numeral 770 of FIG. 7) is therefore potentially rendered redundant in this particular embodiment since editing may be completed solely on-the-fly, although the server (reference numeral 750 of FIG. 7) is preferably still used to control archiving of composite video data from multiple clients and to entice post-activity purchase through the alert, reminder and prompt mechanism outlined in process blocks 210 and onwards (of FIG. 4).

It will, of course, be appreciated that the above description has been given by way of example only and that modifications in details may be made within the scope of the present invention. For example, whilst one preferred embodiment has been described in to context of a skier, other applications are clearly envisaged, including within a bobsleigh ride and a car race track. Also, whilst the controller has been described as a computer, it will be appreciated that its functionality can be both distributed across multiple hardware elements or realised by software based on a centralised server. The skilled person will furthermore appreciate that the various embodiments of the present invention can be implemented in a complementary fashion where it is evident that that features are not mutually exclusive. For example, GPS tracking or other forms of suitable positioning (including triangulation) known to skilled addressee can be applied more broadly across the various embodiments to assist in activation and deactivation of outboard cameras.

Use of the RFID tags and related identities can, in certain embodiments, be made independent of the position based system that acquires multiple data streams to produce a composite video or movie. Also, whilst it is preferred to have an onward routing address that permits a composite video (or portion) to be forwarded to the rider in an automated process that acts to remind or encourage the rider to obtain the video, this is one option within one aspect of the totality of the inventive concepts disclosed therein. Therefore, unless the context otherwise strictly requires a specific combination of features, the skilled person will readily appreciate that the various embodiments and aspects can either be independent of one another, or combined together. For example, when the server, editing suite or control processor is configured automatically to control assembly of a composite video constructed from splicing together of time stamped video content from selected ones of the plurality of cameras with correspondingly synchronized position and time data recovered from the portable location and tracking unit, the requirement for RFID entry (at least in some embodiments) may be superfluous or substituted for an equivalent form of unique identifier.

The invention claimed is:

1. A video acquisition and compilation system comprising:
   a) a portable location and tracking unit having a unique identity, the portable location and tracking unit arranged to record and store position data against time;
   b) a plurality of cameras arranged to capture and communicate time-stamped video content, the cameras arranged in time synchronicity with respect to the portable location and tracking unit, the cameras positioned, in use, at known locations across a geographic region; and
   c) a server arranged to effect storage in a database of both the time-stamped video content and also the position data and time of the portable tracking unit, the server configured automatically to control assembly of a composite video constructed from splicing together time stamped video content from the plurality of cameras with correspondingly synchronized position and time data recovered from the portable location and tracking unit, wherein storage in the database of composite video at least cross-references the unique identity of the portable tracking unit against client details, wherein:
   the client details are pre-registered and are a client address stored in the form of at least one of an internet account and a cell phone number, and
   after assembly of the composite video, the system is arranged to make the composite video available to the client address by:
   automatically sending directly to the client address a content-restricted portion of the composite video or a content-restricted photographic image obtained from one of said plurality of cameras, wherein content restriction has the effect of at least one of: i) reducing quality or quantity of the sent composite video or sent photographic image; ii) limiting use of the sent composite video or sent photographic image by inclusion of a watermark in the sent composite video or the sent photographic image; iii) preventing storage of a data stream that communicates the composite video or photographic image; or iv) limiting the number of times that the sent composite video or sent photographic image can be reviewed without payment for unrestricted access to the composite video; and
   following automated delivery by the server of a message reminder to the client address, the system is further arranged to provide selective access to the composite video, wherein the message reminder contains a log-in code of the composite video or photographic image code in the database.

2. The video acquisition and compilation system according to claim 1, wherein the composite video is rendered and stored directly onto a portable storage device.

3. A method of assembling a video, the method comprising:
   in a portable location and tracking unit having a unique identity, recording and storing position data against time;
   at each of a plurality of cameras positioned at known locations across a geographic region, capturing time-stamped video content and communicating this time-stamped video content to a remote database, the cameras arranged in time synchronicity with respect to the portable location and tracking unit;
   storing in the remote database both the time-stamped video content from each of the cameras and also the position data and time recovered from the portable tracking unit;
   automatically assembling a composite video constructed from splicing together time stamped video content from the plurality of cameras with correspondingly synchronized position and time data recovered from the portable location and tracking unit, the composite video cross-referenced against at least the unique identity of the portable tracking unit and client details, wherein:
   the client details are pre-registered and are a client address stored in the form of at least one of an internet account and a cell phone number and the method further includes;
   after assembly of the composite video, making the composite video available to the client address by:
   automatically sending directly to the client address a content-restricted portion of the composite video or a content-restricted photographic image obtained from one of said plurality of cameras, wherein content restriction has the effect of at least one of: i) reducing quality or quantity of the sent composite video or sent photographic image; ii) limiting use of the sent composite video or sent photographic image by inclusion of a watermark in the sent composite video or the sent photographic image; iii) preventing storage of a data stream that communicates the composite video or photographic image; or iv) limiting the number of times that the sent composite video or sent photographic image can be reviewed without payment for unrestricted access to the composite video; and
   following automated delivery by the server of a message reminder to the client address, providing selective access to the composite video, the message reminder containing a log-in code of the composite video or a photographic image code in the database.

4. The method of assembling a video in accordance with claim 3, further comprising:
   rendering and storing the composite video directly onto a portable storage device.

5. The method of assembling a video in accordance with claim 3, further comprising:
   determining whether access to a data record containing the composite video has occurred; and
   generating the message if no access to the data record has occurred within a predetermined time.

6. The method of assembling a video in accordance with claim 5, further comprising:
   ascertaining whether the data record is wanted; and
   confirming a delivery format for the data record in the event that the data record is wanted.

7. The method of assembling a video in accordance with claim 6, further comprising:
   withholding delivery of the data record until payment has been verified.

8. A video acquisition and compilation system comprising:
   a) a portable location and tracking unit arranged to record and store position data against time;
   b) a plurality of cameras arranged to capture and communicate time-stamped video content, each camera arranged in time synchronicity with respect to the portable location and tracking unit, each camera having known instantaneous locations; and
   c) a server responsive to the data recorded by the portable location and tracking unit and further responsive to the time-stamped video content, the server arranged to effect storage in a database of both the time-stamped video content and the position data and time of the portable tracking unit, the server arranged to configured automatically to control assembly of a composite video constructed from splicing together time stamped video content from selected ones of the plurality of cameras with correspondingly synchronized position and time data recovered from the portable location and tracking unit, wherein storage in the database of composite video at least cross-references the unique identity of the portable tracking unit against client details, wherein:

the client details are pre-registered and are a client address stored in the form of at least one of an internet account and a cell phone number, and after assembly of the composite video, the system is arranged to make the composite video available to the client address by:

automatically sending directly to the client address a content-restricted portion of the composite video or a content-restricted photographic image obtained from one of said plurality of cameras, wherein content restriction has the effect of at least one of: i) reducing quality or quantity of the sent composite video or sent photographic image; ii) limiting use of the sent composite video or sent photographic image by inclusion of a watermark in the sent composite video or the sent photographic image; iii) preventing storage of a data stream that communicates the composite video or photographic image; or iv) limiting the number of times that the sent composite video or sent photographic image can be reviewed without payment for unrestricted access to the composite video; and following automated delivery by the server of a message reminder to the client address, the system is further arranged to provide selective access to the composite video, wherein the message reminder contains a log-in code of the composite video or photographic image code in the database.

9. The video acquisition and compilation system of claim 8, wherein at least one of the cameras is mobile and located proximate to the portable location and tracking unit.

10. The video acquisition and compilation system of claim 8, wherein the data recorded by the portable location and tracking unit and the time-stamped video content share a common reference time.

11. The video acquisition and compilation system of claim 8, wherein the server is arranged to receive streamed time-stamped video content from at least one camera.

12. The video acquisition and compilation system of claim 11, wherein the streamed time-stamped video content is, during operation of the system, continuously received from a plurality of cameras.

13. The video acquisition and compilation system of claim 11, wherein the portable location and tracking unit is arranged to stream said position and related time data to the server.

14. The video acquisition and compilation system of claim 11, wherein the portable location and tracking unit is arranged selectively, upon request, to download said position and related time data to the server.

* * * * *